(No Model.)
W. E. PEARSON.
POP SAFETY VALVE.
No. 320,280. Patented June 16, 1885.
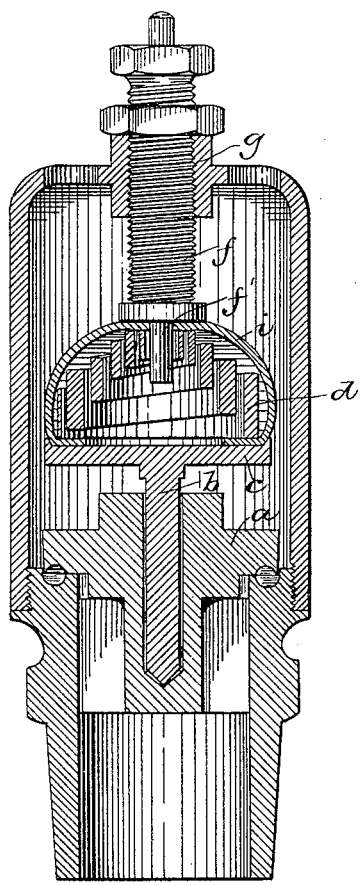
Witnesses.
H Brown.
A. L. White.
Inventor.
W. E. Pearson
by Might & Brown
Attys.

UNITED STATES PATENT OFFICE.

WILLIAM E. PEARSON, OF SAUGUS, MASSACHUSETTS.

POP SAFETY-VALVE.

SPECIFICATION forming part of Letters Patent No. 320,280, dated June 16, 1885.

Application filed April 25, 1885. (No model.)

*To all whom it may concern:*

Be it known that I, WILLIAM E. PEARSON, of Saugus, in the county of Essex and State of Massachusetts, have invented certain Improvements in Pop Safety-Valves, of which the following is a specification.

This invention has for its object, first, to provide certain improvements in pop safety-valves, whereby compactness of form is attained, and, secondly, to protect the spring of a pop safety-valve from the action of steam and moisture.

To these ends my invention consists, first, in a safety-valve having a volute holding-down spring arranged over the valve, between it and a stud affixed to the casing over the valve and spring; and, secondly, in a flexible cover or diaphragm-plate inclosing and entirely covering the spring of a safety-valve, so as to exclude steam and water therefrom, as I will now proceed to describe.

The accompanying drawing represents a vertical central section of a safety-valve having my improvements.

In carrying out my invention I provide the steam-valve $a$ with a stem, $b$, having spring-supporting disk $c$. On said disk I place a volute spring, $d$. In the upper portion of the inclosing-case $e$, I place a threaded stud, $f$, which is vertically adjustable in a threaded socket, $g$, in the casing, its lower end supporting the upper end of the volute spring, and being preferably provided with a reduced stem, $f'$, projecting into the interior of the spring, to prevent the sidewise displacement thereof. The form of the spring makes the distance between its upper and lower ends so short that a central spindle or rod to prevent the spring from yielding laterally is not required.

$i$ represents a cover or diaphragm of rubber or other suitable flexible material impervious to water. Said diaphragm is clamped at its center between the upper end of the spring and the lower end of the stud $f$, and at its margin between the lower end of the spring and the disk $c$, and constitutes a steam and water tight flexible cover, $w$, which protects the spring from the injurious action of the steam and water of condensation without interfering with its movements. The usefulness of the spring is thus preserved indefinitely, the corrosive and other injurious action to which the springs of safety-valves are subjected being entirely prevented.

It will be seen that the volute spring is much more compact than the spiral spring usually employed in this class of valves, and can be more readily protected or covered by the flexible diaphragm.

I do not limit myself, however, to the use of the volute spring in connection with the diaphragm, as the advantage of compactness of form resulting from the volute spring is not dependent on the diaphragm; nor do I limit myself to the use of a flexible protecting cover or diaphragm on a volute spring, as said cover may be applied, if desired, to valve-springs of other form.

I am aware that a volute spring has been placed below a safety-valve, so as to bear downwardly on a rod attached to the valve, and projecting downwardly therefrom; hence I do not claim, broadly, a volute spring, excepting when interposed between the valve and a fixed support independent of the valve.

I claim—

1. In a pop safety-valve, the combination of the valve having a spring-supporting surface, a casing having a stud or bearing for the spring independent of the valve, and a volute spring interposed between the valve and bearing, the form of the spring enabling a guiding-spindle to be dispensed with and the length of the casing to be reduced to the minimum, as set forth.

2. In a pop safety-valve, the combination of the valve, the disk or plate $c$ above the valve and supported thereby, the casing over the valve, the adjustable stud in the top of the casing, and the interposed volute spring, the form of the spring enabling it to operate without a guide or spindle.

3. In a pop safety-valve, the combination of the valve-supported disk or plate $c$, the stud $f$, the interposed volute spring, and the flexible diaphragm clamped centrally between the upper end of the spring and the stud $f$, and at its margin between the lower end of the spring and the plate $c$, as set forth.

In testimony whereof I have signed my name to this specification, in the presence of two subscribing witnesses, this 31st day of January, 1885.

WILLIAM E. PEARSON.

Witnesses:
C. F. BROWN,
A. L. WHITE.